(12) United States Patent  (10) Patent No.: US 8,289,644 B2
Holmberg  (45) Date of Patent: Oct. 16, 2012

(54) VARYING DATA READER RESPONSE

(75) Inventor: Mike Holmberg, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 12/838,020

(22) Filed: Jul. 16, 2010

(65) Prior Publication Data

US 2012/0014012 A1 Jan. 19, 2012

(51) Int. Cl.
*G11B 5/03* (2006.01)

(52) U.S. Cl. .......................................................... 360/66

(58) Field of Classification Search .................. 360/66, 360/31, 75, 313, 319, 245.4; 324/252, 207.21; 345/173
See application file for complete search history.

(56) References Cited

U.S. PATENT DOCUMENTS

| | | | |
|---|---|---|---|
| 5,461,526 A * | 10/1995 | Hamakawa et al. | 360/327.31 |
| 5,754,354 A | 5/1998 | Tomita et al. | |
| 5,982,177 A * | 11/1999 | Cadieu | 324/252 |
| 6,060,969 A * | 5/2000 | Hufgard et al. | 335/207 |
| 6,359,444 B1 * | 3/2002 | Grimes | 324/633 |
| 7,148,881 B2 * | 12/2006 | Lee et al. | 345/173 |
| 7,301,734 B2 | 11/2007 | Guo et al. | |
| 7,405,556 B2 * | 7/2008 | Breuer et al. | 324/207.21 |
| 7,460,328 B2 | 12/2008 | Chase et al. | |
| 7,548,395 B2 | 6/2009 | Biskeborn et al. | |
| 7,602,579 B2 | 10/2009 | Biskeborn et al. | |
| 2003/0132920 A1 * | 7/2003 | Lee et al. | 345/173 |
| 2009/0309581 A1 * | 12/2009 | Fermon et al. | 324/207.21 |
| 2010/0006562 A1 * | 1/2010 | Clothier | 219/494 |
| 2010/0085664 A1 * | 4/2010 | Hirata et al. | 360/245.4 |
| 2010/0142100 A1 * | 6/2010 | Yoshida et al. | 360/313 |
| 2010/0149696 A1 * | 6/2010 | Chen et al. | 360/313 |
| 2010/0246042 A1 * | 9/2010 | Antoku | 360/31 |
| 2010/0248623 A1 * | 9/2010 | Haratani et al. | 455/41.1 |
| 2010/0322283 A1 * | 12/2010 | Clothier et al. | 374/176 |
| 2011/0007427 A1 * | 1/2011 | Qiu et al. | 360/319 |
| 2011/0187350 A1 * | 8/2011 | Ausserlechner et al. | 324/202 |
| 2011/0199073 A1 * | 8/2011 | Myers et al. | 324/117 R |
| 2011/0232079 A1 * | 9/2011 | Miyauchi et al. | 29/603.07 |
| 2011/0279923 A1 * | 11/2011 | Miyauchi et al. | 360/75 |

* cited by examiner

*Primary Examiner* — Fred Tzeng

(57) ABSTRACT

A reader apparatus is disclosed to read data magnetically stored on a storage medium. The apparatus has a sense structure to change resistance in response to a proximity of a stored magnetic field, and a variable magnetic field biasing arrangement to vary an active response length of the sense structure.

19 Claims, 7 Drawing Sheets

VARYING DATA READER RESPONSE

BACKGROUND

In magnetic read and/or write systems, due to the introduction of noise from adjacent tracks, data tracks written more narrowly than a nominal track width can be difficult or impossible to read using a read head, the active length (that is, extent laterally of the track) of which is specified for reading nominally wider data tracks. Variations in environmental conditions, for example in temperature, humidity and/or vibration, can cause the width and/or position of data elements written to a data storage medium to vary significantly from nominal. Effects of tolerances, wear, and/or quality variations of a read/write drive mechanism and/or media cartridge may also contribute to overly narrow and/or wandering data tracks. Read problems can be exacerbated in the case of removable storage media that may be written and read by different respective drives.

Relatively narrowly written data can be nominally specified in some cases, for example to obtain high capacity data storage using multiple data tracks concurrently written by a multiple element transducer head. For multiple parallel data tracks, the outer tracks can be unduly affected by media expansion and/or contraction effects, which in some cases can take the outer tracks out of range of the outer read elements of a transducer head unless the outer tracks are narrowly written relative to other tracks. This situation can introduce complexity in designing a drive for a high capacity data storage format that can also read formats requiring relatively wide read heads for all tracks.

BRIEF DESCRIPTION OF THE DRAWINGS

In order that the invention may be well understood, various embodiments thereof will now be described, by way of example only, with reference to the accompanying drawings, in which.

DETAILED DESCRIPTION

Figure 1:
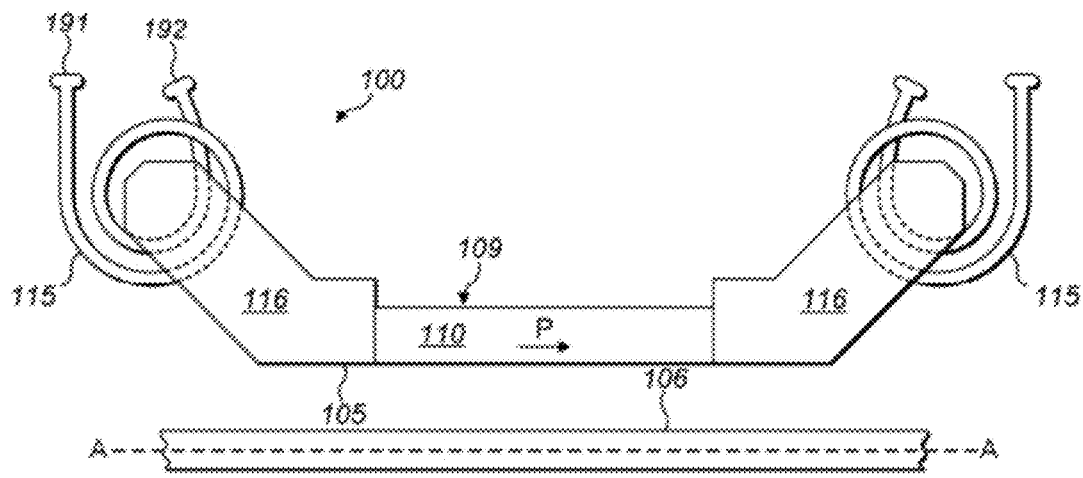
FIG. 1 is a schematic diagram, not to scale, showing portions of a reader apparatus according to an example embodiment, having a variable magnetic field biasing arrangement in the form of an electromagnet.

Embodiments of the invention provide reader apparatus to read data magnetically stored on a storage medium. Embodiments are applicable to any technology in which data is read using relative movement between a stored data field and a data reader sensitive to magnetic orientation effects caused by the stored field. In some examples, the reader apparatus comprises a read element including a sense structure to sense a proximity to an active region of the sense structure of a stored magnetic field representative, for example, of a stored data bit. For example, in response to a stored magnetic field moving in and out of proximity to the active region of the sense structure, a resultant change of magnetic orientation of a sense layer of the sense structure causes a change in resistance, or resistivity, of the sense structure experienced by a sense current applied along the sense structure. The sense structure is, for example, a magnetoresistive structure such as an AMR (anisotropic magnetoresistive) or GMR (giant magnetoresistive) structure.

In some embodiments, the reader apparatus includes a variable magnetic field biasing arrangement to vary an active response length of the sense structure. The variable bias is, for example, directed in a longitudinal direction along the sense structure, that is, in a direction generally parallel to a storage-media-facing side of the sense structure and/or parallel to a plane of the storage media, in use. In some embodiments, variation of the longitudinal bias enables adjustment of an extent of a region of the read element that responds magnetically to the stored data. In some examples, data on a magnetic storage medium is read using changes in a sense current passing along a sense structure during relative movement of the sense structure and the stored data, and a response length of the sense structure is set using a magnetic field applied along the sense structure by an electromagnet.

It has long been the practice in the magnetic recording industry that reader active extent, for example the length of the reader active region across a width of a track, sometimes called reader width, cannot be varied easily after reader elements are fabricated, for example by deposition on a wafer. Various embodiments described herein permit dynamic adjustment of reader length to facilitate reading of narrowly written data, while permitting the use of a wider reader length for more efficient (for example, lower noise, lower error rate) reading of more widely written data. This can, for example, facilitate successful recovery of otherwise unrecoverable overly narrow and/or wandering data tracks caused for example by the effects of low tolerances and/or high wear in a storage device that wrote or is reading the data and/or in a storage medium.

The variable biasing arrangement in some embodiments comprises an electromagnet. In some embodiments, a persistent longitudinal bias is provided by a permanent magnet arrangement, for example to facilitate reduced domain noise and facilitate consistent reading. The variable biasing arrangement in some examples acts to supplement the persistent longitudinal bias. In alternative embodiments, the variable biasing arrangement also provides a persistent bias component. In some embodiments, there may be no permanent magnet longitudinal bias. An example variable biasing arrangement comprises an electromagnet core disposed proximate an end of the sense structure, and a winding to connect to a current supply.

Conveniently, the reader apparatus is fabricated using thin film technology, and the winding is fabricated in a layer as a generally planar structure disposed adjacent a portion of the electromagnet core, the electromagnet core portion being disposed in a further layer. In some examples, a respective electromagnet core is disposed proximate each respective opposite end of the sense structure. Conveniently, a winding is provided corresponding to each respective electromagnetic core. Alternatively, a common winding is provided for the electromagnet cores. In some embodiments, a transducer head is provided comprising a plurality of read elements, each read element comprising respective reader apparatus as described above, to concurrently read a plurality of respective data tracks stored on a storage medium. Conveniently, the transducer head is fabricated using layers.

According to some embodiments, a magnetic data storage device comprises adjuster apparatus to adjust an extent of the region of a read element that responds magnetically to the stored data. In some embodiments, the magnetic data storage device comprises a tape drive to read a plurality of data tracks stored on a medium in the form of a magnetic storage tape, and includes a multiple read element transducer head, and a controller to vary the active response length of at least some of the read elements. Conveniently, the response length is set in response to at least one of: a read error rate, a track lateral position, a track width, a change of data format to or from a multi-width track format. Some examples provide a method of reading data on a magnetic storage medium using changes in a sense current passing along a sense structure during relative movement of the sense structure and the stored data, the method comprising setting a response length of the sense structure using a magnetic field applied by an electromagnet along the sense structure.

At least some embodiments facilitate the provision of a convenient multiple element head design for read compatibility between data formats that use different nominal widths of at least some data tracks, for example between a format using wider data tracks and a higher capacity format using narrower outer tracks and relatively wide inner tracks. In some embodiments, dynamic handling is facilitated of transverse dimensional instability effects relating to a data storage medium, more efficient longer reader lengths being used when medium dimensional instability effects are low, and shorter reader lengths otherwise being employed when appropriate for specific tracks. Furthermore, some embodiments provide fine resolution adjustment of reader length in a continuously variable manner, for example to an optimum appropriate length taking into account the characteristics of a specific data track. Some embodiments facilitate convenient manufacture of a variable length reader and/or multiple read element transducer head using layering technology, for example thin film layering on a wafer.

FIG. 1 is a schematic diagram, not to scale, showing portions of a reader apparatus 100 according to an example embodiment. The diagram shows a transverse section through the reader apparatus 100, that is, along a plane extending generally transversely to a storage-medium-facing side 105 of the reader apparatus 100, which side 105 is in turn arranged generally parallel to a plane of movement A-A of a storage medium 106, in use. The example reader apparatus 100 includes a magnetoresistive sense structure 109 having a sense layer 110 comprising, for example, NiFe and/or any suitable alternative material. A change in the magnetic orientation of an active region of the sense structure 109 produces a lower resistance across the sense structure 109. The reader apparatus 100 also has a variable magnetic field biasing arrangement in the form of a respective electromagnet having an electrically conductive winding 115 and a core 116 disposed proximate each respective opposite end of the sense structure 109. While the core 116 is shown adjacently abutting the sense structure 109, in some embodiments additional intervening elements or layers (not shown) can be disposed between the core 116 and the sense structure 109.

Figure 2:
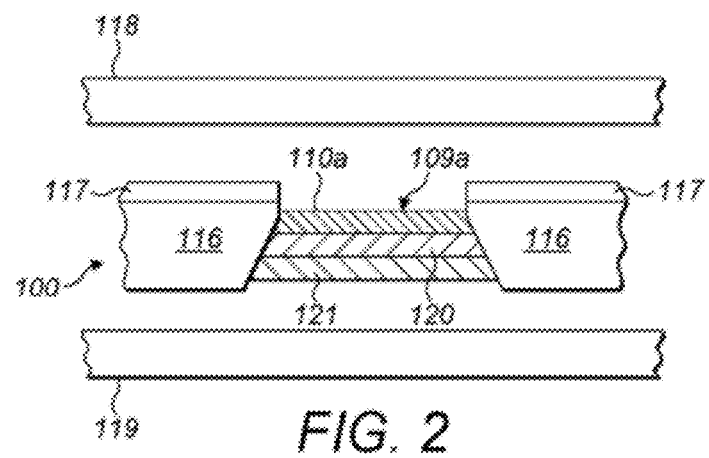
FIG. 2 is a schematic diagram of portions of an embodiment of the reader apparatus having an AMR sense structure.

FIG. 2 is a schematic diagram of portions of an embodiment of the reader apparatus 100 in which the sense structure is an AMR sense structure 109a, viewed in a direction towards the medium-facing-side 105 (from below as shown in FIG. 1). The example AMR, also sometimes called MR, sense structure 109a comprises a magnetoresistive sense layer 110a, an insulating spacer layer 120 and a soft adjacent layer (SAL) 121. A transverse magnetic field generated in the SAL can be used to provide a transverse biasing magnetic field in the sense layer 110a to keep the transverse magnetic field always positive or always negative within its specified range of operation, to avoid potential ambiguity during operation caused by positive and negative transverse magnetic field values of similar magnitude producing similar resistance changes in the sense layer 110a. A conductive lead 117 for connection to a power supply is provided at each side of the sense structure 109 to form part of a sense circuit (not shown) in which a sense current flows. In use, a transverse magnetic field of a recorded data bit moving relative to the sense structure in a direction across the layers 110a, 120, 121, for example perpendicular to the plane of the paper as shown in FIG. 1, causes a rotation of the sensing layer's magnetic orientation in a transverse (vertical in FIG. 1) plane, that is, in a plane parallel to the major faces of the sense layer 110a. As the direction of orientation rotates in a range between parallel (longitudinal) and transverse, the change of orientation can be sensed using the sense circuit, for example by monitoring a voltage of a sense current flowing through the sense circuit including the sense layer 110a, enabling reading of the data bit. [I think I got lost on this one. Transversely (vertically in the orientation of FIG. 1) and longitudinally extending shields 118, 119 of soft magnetic material such as, for example, NiFe are respectively spaced apart along an axis of media travel on opposite sides of the sense structure 109, 109a, 109b, to direct the magnetic field of a proximate stored data element into an active region of the reader apparatus.

Figure 3:
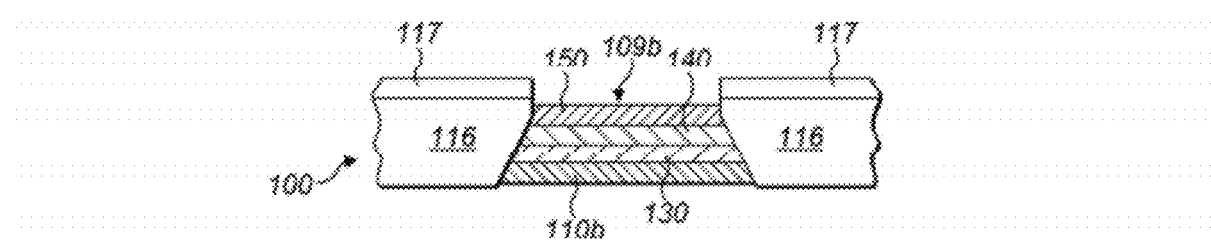
FIG. 3 is a schematic diagram of portions of an embodiment of the reader apparatus having a GMR sense structure.

FIG. 3 is a schematic diagram of portions of an embodiment of the reader apparatus 100 viewed in a direction towards the medium-facing-side 105 (from below as shown in FIG. 1), in which the sense structure is a GMR sense structure 109b. Like reference numerals are used for features that are common between the figures. Shields 118, 119 are not shown in FIG. 3. The example GMR sense structure 109b comprises a sense layer 110b (also called a free layer), a conducting spacer layer 130, a pinned layer 140 and an antiferromagnetic exchange film layer to fix (pin) the magnetic orientation of the pinned layer 140. The sense layer 110b, spacer layer 130, and pinned layer 140 are sufficiently thin to permit sense current electrons to move between them. In use, a transverse magnetic field of a recorded data bit moving relative to the sense structure 109b, causes a rotation of the magnetic orientation of the sensing layer 110b in a transverse plane parallel to the major faces of the sense layer 110b. The change of orientation of the sensing layer 110b causes a change in the combined resistance of the sense layer 110b and pinned layer 140 of the sense structure 109b due to magnetic field effects on electrons of different spin. Thus, a passing bit can be sensed, for example, by monitoring a voltage of a sense current flowing through the sense structure 109b including the sense layer 110b and pinned layer 140.

Figure 4:
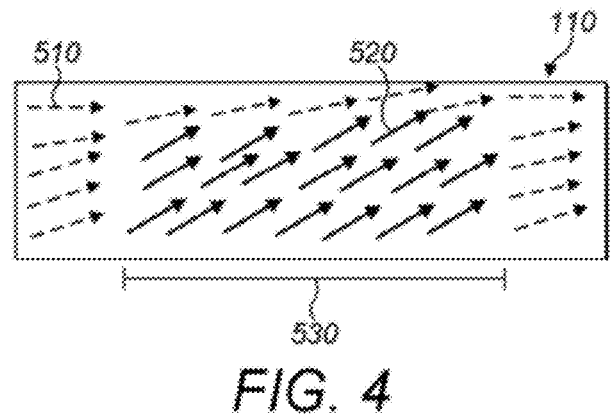
FIGS. 4 and 5 respectively illustrate a pattern of magnetic orientation of various regions of a sense layer of a sense structure of the reader apparatus when subjected to different strengths of longitudinal magnetic bias.
Figure 5:
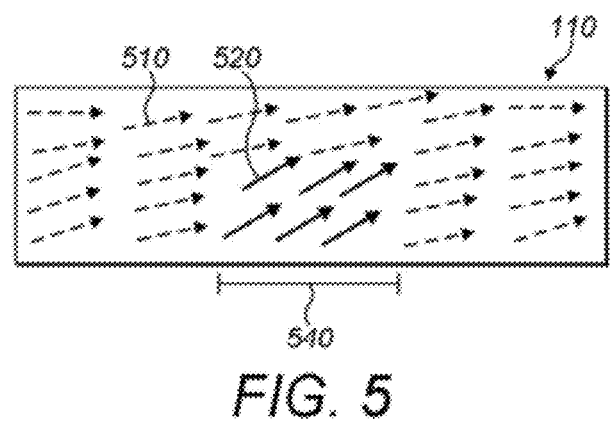

The electromagnet 115, 116 of the reader apparatus 100 described with reference to FIG. 1 provides a magnetic field acting along the sense structure 109 in a longitudinal direction (for example, in the direction shown by arrow P). The longitudinal field strength can be set and varied by varying a current supplied to the winding 115 by connecting to the contacts 191, 192. FIGS. 4 and 5 respectively illustrate a general pattern of magnetic orientation of various regions of the sense structure 109, 109a, 109b when subject to different strengths of longitudinal, or horizontal, magnetic force in the direction of arrow P (to the right as shown in FIGS. 4 and 5). The applied magnetic force includes a persistent longitudinal biasing component that results in an inactive region or regions, illustrated by broken arrows 510 in FIGS. 4 and 5, and an active region illustrated by unbroken arrows 520.

FIG. 4 illustrates a condition in which a persistent longitudinal bias magnetic field causes a relatively short "dead zone" at mutually opposite end portions of the sense structure, and a longer resultant active response length 530 over which the magnetic orientation is affected by passing stored data bits. Providing a persistent longitudinal bias facilitates, for example, more stable and less noisy magnetic domain, and more consistent sense signals, relative to having no bias.

FIG. 5 illustrates a condition in which a variable longitudinal biasing magnetic field augments the persistent longitudinal bias, causing a longer "dead zone" at opposite end portions of the sense structure 109, 109a, 109b, and a shorter resultant active response length 540. Variation of the longitudinal biasing field strength enables adjustment of the extent 530, 540 of the region of the read element that responds magnetically to the stored data. The configuration of the core 116 shown in FIG. 1 causes a greater magnetic field strength to be applied to the uppermost region of the sense structure 109, 109a, 109b, resulting in a dead zone region of the sense structure located away from the media-facing-side 105 and intermediate the end portions of the sense structure 109, 109a, 109b.

Figure 6:
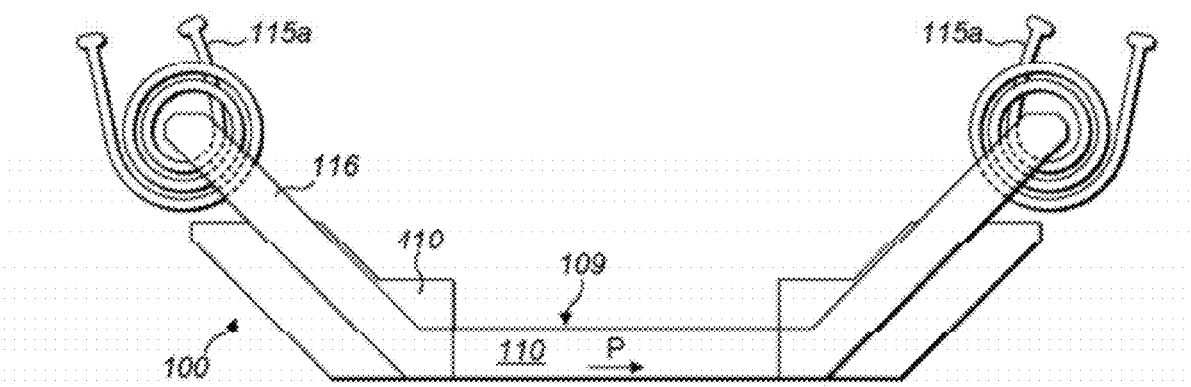
FIGS. 6 and 7 show embodiments of the reader apparatus in which a permanent magnet provides a persistent bias component.
Figure 7:
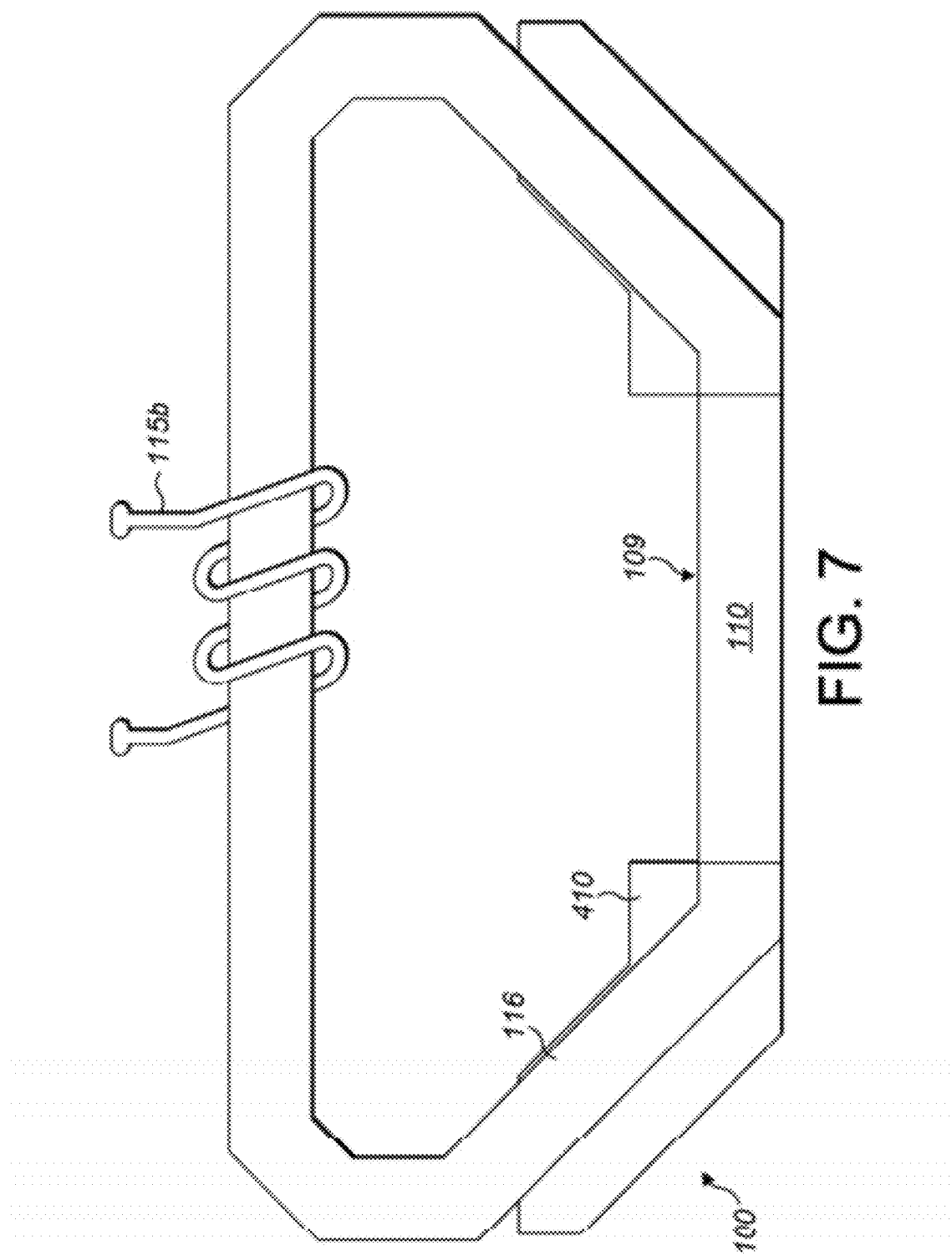

FIGS. 6 and 7 show embodiments of the reader apparatus 100 in which a respective permanent magnet 410 of magnetically hard material such as an alloy of CrPtCo, or any suitable alternative material, is disposed proximate each respective opposite end of the sense structure 109, in addition to a core 116 of magnetically soft material such as NiFe 80/20 permalloy, or any suitable alternative material. In some embodiments, additional intervening elements or layers (not shown) can be disposed between the ends of the sense structure 109 and the permanent magnet 410 and/or soft core 116. The permanent magnet 410 provides a persistent longitudinal bias. In FIG. 6, a respective electrically conductive winding 115a is provided to energize a respective core 116 at each side of the sense structure 109. The example winding 115a is a three turn planar microcoil, but any appropriate alternative coil could be employed, with any appropriate number of turns. In FIG. 7, the core portions 116 on opposite sides of the sense structure 109 are contiguous, and a single winding, such as the three turn solenoid winding 115b shown, is employed to energize both cores 116.

The core 116 in the embodiment described with reference to FIG. 1 in some examples comprises a magnetically soft material, for example an alloy of 45% Ni 55% Fe having relatively high saturation magnetization, or any other suitable material, and current can be supplied to the winding 115 to provide both a variable longitudinal bias component and also a persistent longitudinal bias component. Using the soft core 116 described in the immediately preceding sentence, there may in some examples be no permanent magnet. In alternative examples, the core 116 of FIG. 1 comprises a permanent magnet, and the winding 115 energises the magnetically hard material to provide the variable electromagnetic bias field. The winding 115 in FIG. 1 is, for example, a 2 turn microcoil structure, but any alternative number of turns and/or appropriate diameter of winding can be used.

Embodiments of the reader apparatus 100 can be fabricated, for example, by building up various components in thin layers to form any appropriate structure, for example using techniques similar to those discussed in U.S. Pat. No. 7,301, 734 B2, the entire content of which is incorporated herein by reference. The windings 115, 115a can, for example, comprise Cu or any other suitable electrically conductive material, and be fabricated in a layer as a generally planar structure disposed adjacent and parallel to portions of the core 116. An end portion of the core 116 may extend into the plane of the winding within the winding 115, 115a, a further portion of the core 116 extending in an adjacent plane. The reader apparatus 100 in some embodiments is used to form a read element of a multi-element transducer head. For example, read elements can be "stacked" in layers with other elements, such as other read elements and/or write elements, using thin film technology.

Figure 8:
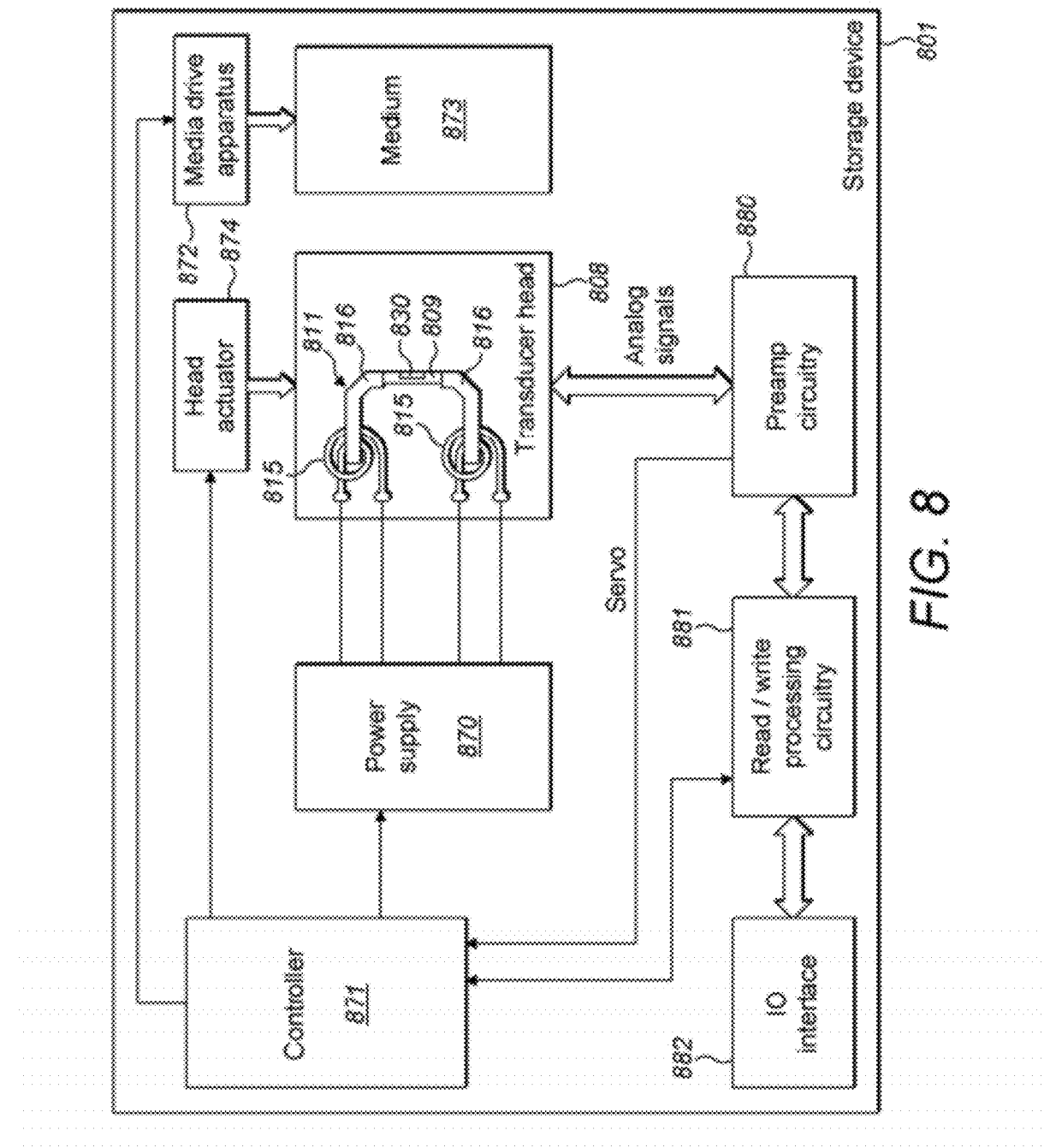
FIG. 8 is a functional diagram showing portions of a storage device.

FIG. 8 is a functional diagram showing portions of a storage device 801 having a transducer head 808 comprising at least one read element 811 including cores 816, windings 815 and a sense element 809, for example a magnetoresistive sense element. The storage device can operate to vary an active extent 830 of the sense element 809 in a similar manner to the read apparatus 100 described above. A power supply 870 is connected to supply current to the windings 815 to energize the cores 816 to apply longitudinal magnetic bias to the sense element 809. A controller 871 is provided to control the current supplied by the power supply, to set or adjust the longitudinal magnetic field across the sense element 809 and thus to set or adjust the extent 830 of the region of the read element 811 that responds magnetically to a stored data bit. A sense circuit (not shown) is also connected to a power supply to provide sensing current to the sense element 809 and enable changes to sense current/voltage to be monitored by the controller 871.

The storage device 801 comprises media drive apparatus 872 for receiving, driving and controlling a storage medium 873, and a head actuator 874 for positioning the head 808 laterally relative to the media. In some embodiments the storage device 801 receives removable media 873, for example in the form of tape in a removable tape cartridge or one or more hard disks in a removable hard disk drive cartridge, and in alternative embodiments the medium 873 is part of the device 801 and is not intended for regular removal and insertion by a user. The controller 871 is connected, for example to preamplifier circuitry 880, to receive servo signals read by the transducer head 808, and to receive information about processed signals and data from read/write processing circuitry 881. The storage device 801 also comprises a data input/output (IO) interface 882 for receiving data into the device 801 and outputting data from the device 801. The controller 871 performs servo control functions to relatively position the head 808 and the medium 873 longitudinally and laterally, and may also perform general drive control functions.

Figure 9:
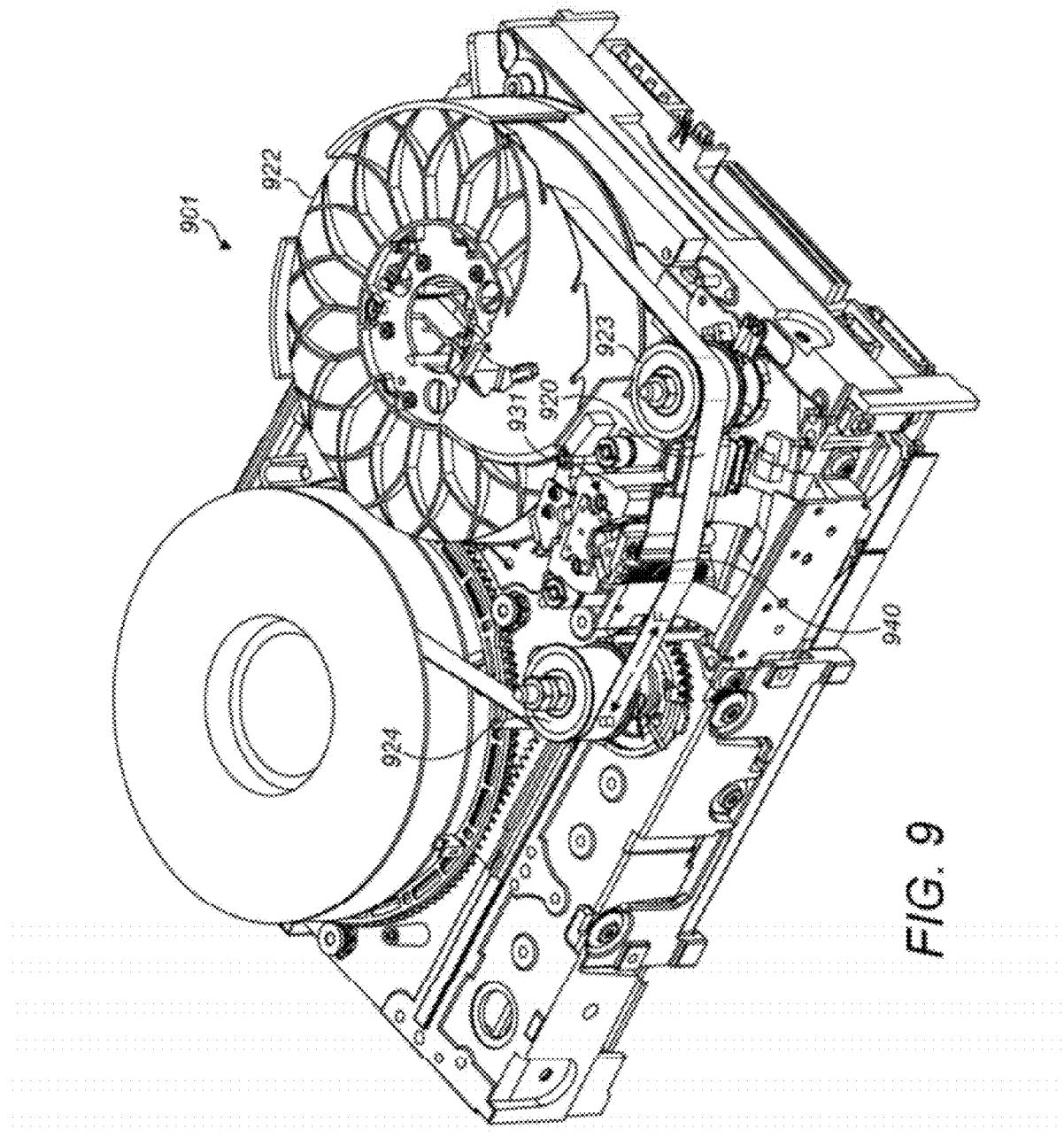
FIG. 9 shows portions of an example data storage device in the form of a tape drive.

Portions of an embodiment of the data storage device 801 in the form of a tape drive 901 are shown in FIG. 9, in which a removable medium in the form a tape 920 is received in the drive 901 and spooled onto a spool 922 of the drive 901. The tape is driven in longitudinal directions B and F of the tape along a path about reels 923, 924 by media drive apparatus in the form of reel motors (not shown), using reel speed sensors (not shown) and servo information read from the tape 920. The path of the tape 920 runs in proximity to a transducer head 940, the lateral position of which is adjustable relative to the tape 920 by controlling a head actuator in the form of a voice coil motor 931. The example tape 920 is formatted with pre-recorded servo information according to a multi-track tape data format such as one of the LTO (Linear Tape Open) formats. The transducer head 940 in some embodiments comprises a plurality of read elements (not shown in FIG. 9) such as read elements 811, and can also comprise corresponding write elements.

Figure 10:
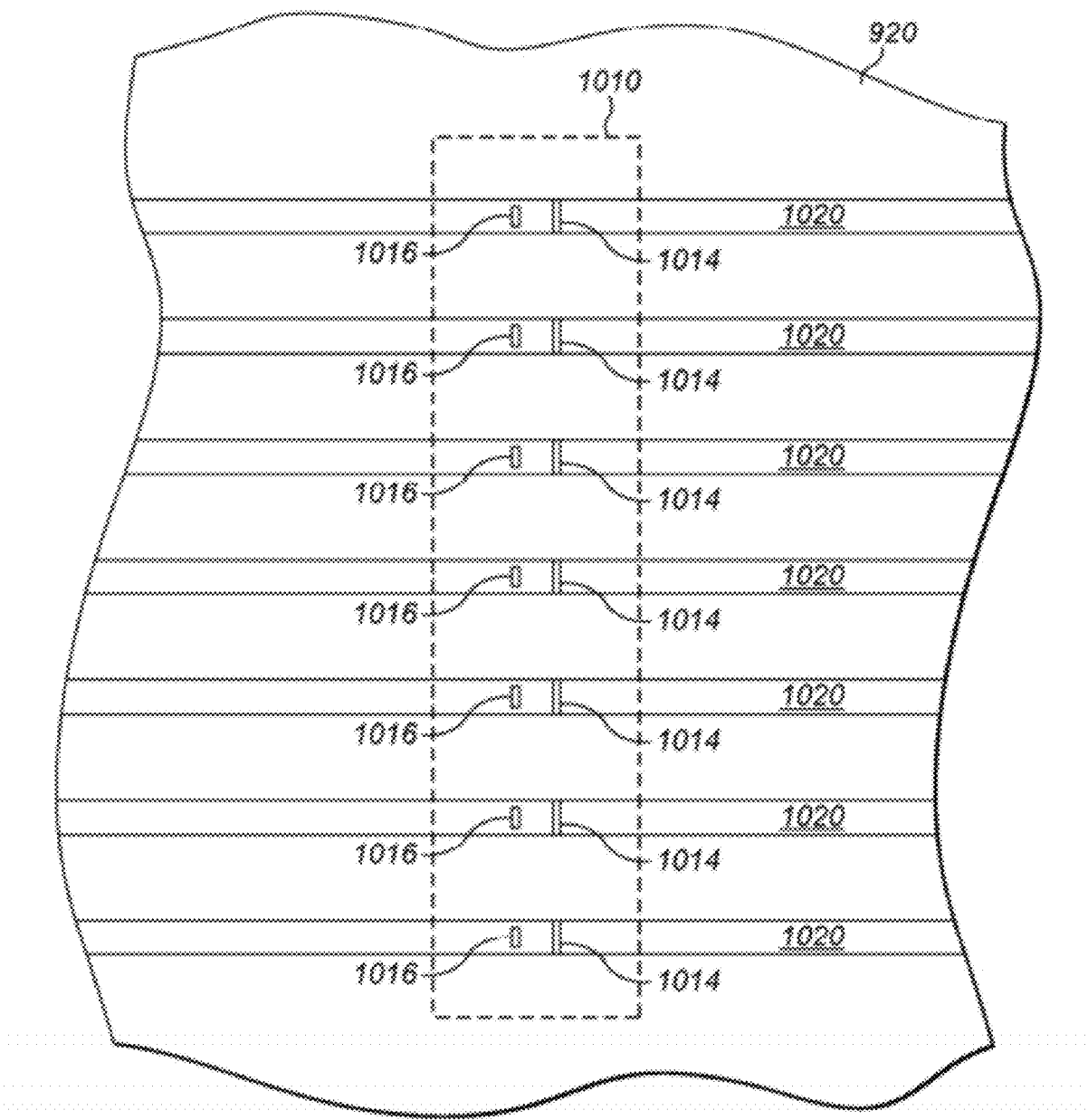
FIG. 10 is a schematic diagram showing a plurality of elements of an example tape transducer head for reading and/or writing data to a tape in concurrent tracks.

FIG. 10 is a schematic diagram showing a plurality of read elements 1016 and corresponding write elements of the tape transducer head 940, for reading and/or writing data to the tape 920 in concurrent parallel tracks 1020 having predetermined nominal lateral widths and lateral positions relative to the pre-recorded servo tracks (not shown). In some embodiments, the controller 871 is configured to receive information from the read channel, for example from the preamp circuitry 880 and/or read processing circuitry 881, relating to at least one of: track read error rate, track lateral position, track width, format of the tape to be read. In response to the received information, the controller 871 operates to set the response length of the sense structure 809 by controlling the current applied to the electromagnet windings 815. Additionally or alternatively, the received information to which the controller is responsive can relate to any appropriate read-back signal parameter that changes when the stored data width written to the media reduces or changes, such as signal to noise ratio, signal amplitude and signal amplitude asymmetry.

In some data formats using multiple concurrently transduced data tracks, relatively narrowly written data can be nominally specified for some tracks to provide high capacity data storage in conditions where outermost tracks could, if broader, be unduly affected by media expansion and/or contraction effects. Using readers of independently and/or dynamically variable length, a transducer head can more easily be made compatible with two or more formats specifying different nominal widths for at least some tracks.

Figure 11:
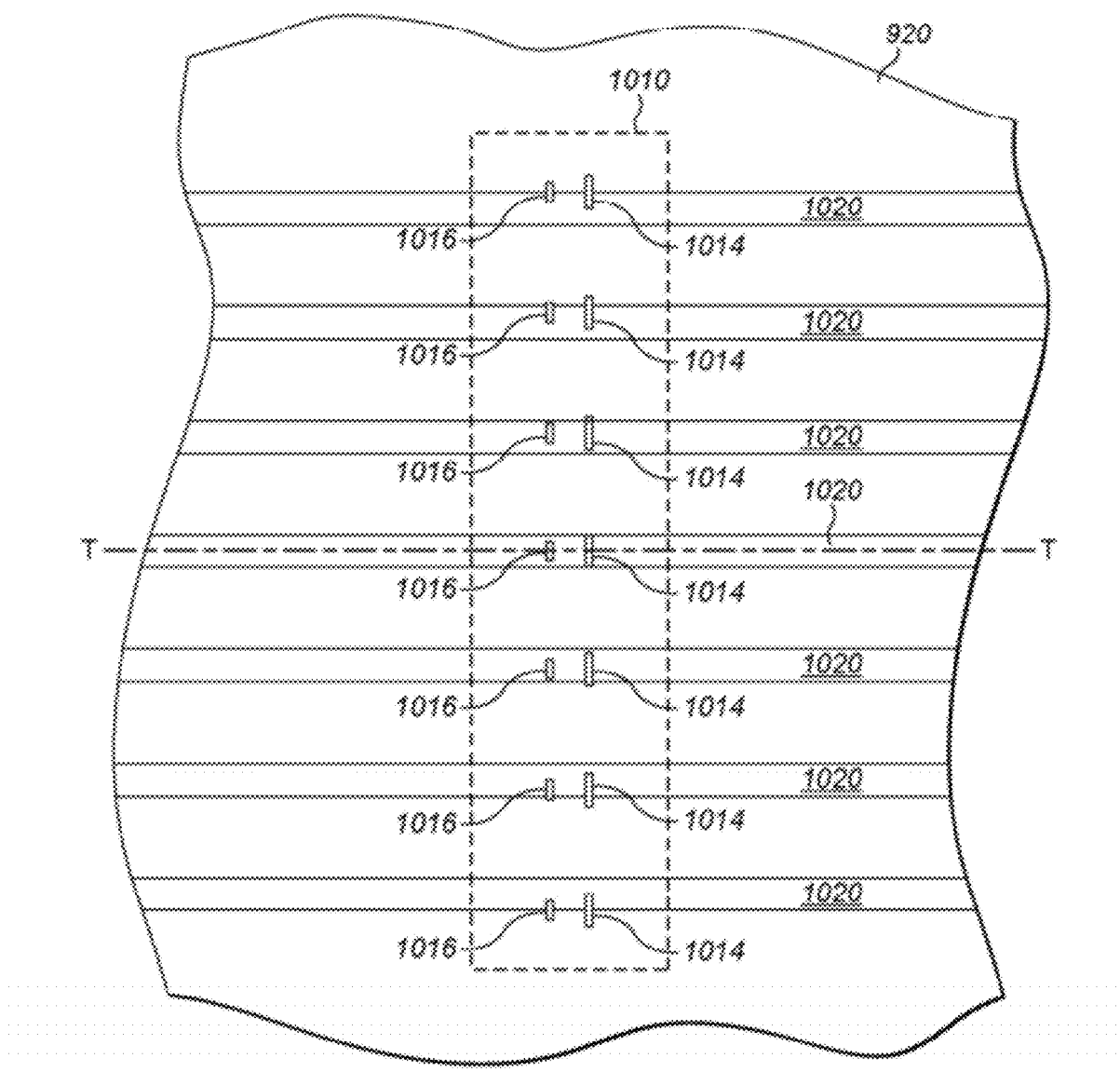
FIG. 11 illustrates possible tape dimensional instability effects, the lateral dimensions of the tape having decreased, changing the lateral positions of some of the tracks shown in FIG. 10 relative to some of the head elements.

While broader reader lengths are generally desirable from the point of view of noise reduction, so that a significant lateral proportion of a magnetic field of each bit on a track is encountered by an active sense region of a reader, if a track is not consistently aligned with a nominal track center, then a lateral end portion of a corresponding reader's active sense region may extend laterally off track, and be affected by magnetic fields of bits in adjacent tracks, thus resulting in a higher error rate. FIG. 11 illustrates possible tape dimensional instability effects, whereby the lateral dimensions of the tape 920 have decreased compared to the nominal positions shown in FIG. 10. It will be seen that read elements 1016 become relatively disposed progressively further from a track longitudinal centre axis the further the track is laterally displaced relative to a tape longitudinal center axis T-T. The outermost read elements 1016 generally experience the most lateral displacement, in extreme cases extending partially beyond the lateral track boundary, increasing the error rate. Lateral displacement effects can also be encountered in cases of tape expansion, whereby the tracks move laterally outwardly relative to the outer read elements 1016. By detecting such tape dimensional instability effects and adjusting the active sense length of the outer read elements 1016, the outer read elements 1016 can be kept fully within track boundaries across a wider range of environmental operating conditions. The controller 871 can be configured to regularly obtain operational data for each track, relating to track lateral disposition, and/or track width, and/or track error rate, and dynamically adjust the active sense length to compensate for tracks that are out of nominal specification, and to revert back to nominal active sense length when out of nominal conditions are not present. This facilitates the recovery of badly written data which would otherwise not be recoverable, without sacrificing read signal quality in normal read conditions.

Successfully aligning multiple reader elements of a head to each of the written tracks on a tape medium can be quite difficult and challenging across a wide range of environmental conditions. According to some embodiments, a head whose reader length can vary (becoming narrower as needed) facilitates alleviation of many interchange related issues that can occur with modern tape drives. In the case of tapes that have been badly written by drives that may show a wide wandering of the track width, a head that can maximize reader length when needed (for gaining the most signal) and then shrinking the length when needed to read these very narrow portions of tape can facilitate data recovery from such tapes. Some embodiments provide a micro-sized electromagnet that is coupled to the readers permanent magnet physical structure which can be energized via an electrical current to boost the permanent magnet's strength to effectively "pinch down" the reader's magnetic length. By pinching down the magnetic reader length the active area that a GMR or AMR type reader uses to sense recorded bit information vanes in proportion to the strength of the biasing magnets.

The controller 871 depicted in FIG. 8 can be implemented as hardware to perform various tasks discussed above. Alternatively, the controller 871 can be implemented as a combination of software and hardware to perform various tasks discussed above. For example, in the latter scenario, the controller 871 can include a processor that is able to execute software instructions to perform the tasks. The processor can include microprocessor, a microcontroller, a processor module or subsystem (including one or more microprocessors or microcontrollers), or other control or computing device. A "processor" can refer to a single component or to plural components. Instructions of the software can be stored in a storage device, which is implemented as one or more computer-readable or computer-usable storage media. The computer-readable storage media includes different forms of memory including semiconductor memory devices such as dynamic or static random access memories, erasable and programmable read-only memories, electrically erasable and programmable read-only memories and flash memories; magnetic discs such as fixed, floppy and removable disks; other magnetic media including tape; and optical media such as compact discs or digital video discs. The instructions can be stored as drive firmware in flash memory within a tape storage device, for example.

Any of the features disclosed in this specification, including the accompanying claims, abstract and drawings, and/or any of the steps of any method or process so disclosed, may be combined in any combination, except combinations where the sum of such features and/or steps are mutually exclusive. Each feature disclosed in this specification, including the accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of any foregoing embodiments. The claims should not be construed to cover merely the foregoing embodiments, but also any embodiments which fall within the scope of the claims. The invention extends to any novel one, or any novel combination, of the features disclosed in this specification, including the accompanying claims, abstract and drawings, or to any novel one, or any novel combination, of the steps of any method or process so disclosed.

The invention claimed is:

1. Reader apparatus to read data magnetically stored on a storage medium, the apparatus comprising a sense structure to change resistance in response to a proximity of a stored magnetic field, and a variable magnetic field biasing arrangement to vary an active response length of the sense structure.

2. The reader apparatus of claim 1, comprising a permanent magnet arrangement to provide a persistent bias, the variable biasing arrangement supplementing the persistent bias.

3. The reader apparatus of claim 1, the variable biasing arrangement comprising an electromagnet including a winding to connect to a current supply.

4. The reader apparatus of claim 3, the variable biasing arrangement comprising an electromagnet core disposed proximate an end of the sense structure.

5. The reader apparatus of claim 4, the reader apparatus fabricated using thin film layer technology, and the winding fabricated in a layer as a generally planar structure disposed adjacent a portion of the electromagnet core, the electromagnet core portion being disposed in a further layer.

6. The reader apparatus of claim 3, the electromagnet core comprising a soft magnetic material.

7. The reader apparatus of claim 3, the variable biasing arrangement comprising a plurality of electromagnet cores respectively disposed proximate opposite ends of the sense structure, a respective winding being provided corresponding to each respective electromagnetic core.

8. The reader apparatus of claim 3, the variable biasing arrangement comprising a plurality of electromagnet cores respectively disposed proximate opposite ends of the sense structure, a common winding being provided for the electromagnetic cores.

9. The reader apparatus of claim 1, the sense structure comprising an MR or GMR structure.

10. A transducer head comprising a plurality of read elements, each read element comprising respective reader apparatus as claimed in claim 1.

11. A tape drive to read a plurality of data tracks stored on a magnetic storage tape, the tape drive comprising a transducer head as claimed in claim 10, and a controller to vary the active response length of at least some read elements.

12. The tape drive of claim 11, the controller to vary the active response length of a read element in response to parameter values relating to at least one of: a read error rate relating to a track corresponding to the read element, a lateral disposition of a track relative to the read element, a width of a track corresponding to the read element, a data format to be read, a signal to noise ratio of a read signal, a read signal amplitude and a read signal amplitude asymmetry.

13. A method of reading data on a magnetic storage medium using changes in a sense current passing along a sense structure during relative movement of the sense structure and the stored data, the method comprising setting a response length of the sense structure using a magnetic field applied by an electromagnet along the sense structure.

14. The method of claim 13, comprising setting the response length in response to at least one stored-data-width dependent parameter relating to a read signal or processed read data.

15. The method of claim 13, further comprising using a plurality of the sense structures to concurrently read a plurality of respective data tracks stored on the storage medium, and setting the response length of at least some of the sense structures in response to detected medium distortion effects and/or data storage format.

16. A magnetic data storage device comprising a read element to read data stored as magnetic data elements on a medium, and adjuster apparatus to adjust an extent of a region of the read element that responds magnetically to the stored data, the adjuster apparatus comprising a variable magnetic biasing arrangement.

17. The magnetic data storage device of claim 16, the read element comprising a magnetoresistive sensor, the variable biasing arrangement comprising an electromagnet core disposed proximate an end of the magnetoresistive sensor and an electromagnet winding connected to a power supply, the adjuster apparatus to vary current supplied to the winding to adjust the extent of the responsive region.

18. The magnetic data storage device of claim 17, further comprising a transducer head having a plurality of the read elements, the head being fabricated using layers; for each read element the winding being fabricated in a layer as a generally planar structure disposed proximate the electromagnet core, the electromagnet core portion being disposed at least partially in a further layer.

19. The magnetic data storage device of claim 16, the adjuster apparatus to adjust the extent of the responsive region in response to at least one of: a read error rate, a track lateral position, a track width, a change of data format to or from a multi-width track format.

* * * * *

UNITED STATES PATENT AND TRADEMARK OFFICE
CERTIFICATE OF CORRECTION

| | |
|---|---|
| PATENT NO. | : 8,289,644 B2 |
| APPLICATION NO. | : 12/838020 |
| DATED | : October 16, 2012 |
| INVENTOR(S) | : Mike Holmberg |

Page 1 of 1

It is certified that error appears in the above-identified patent and that said Letters Patent is hereby corrected as shown below:

In column 10, line 34, in Claim 18, delete "layers;" and insert -- layers, --, therefor.

Signed and Sealed this
Nineteenth Day of February, 2013

Teresa Stanek Rea
*Acting Director of the United States Patent and Trademark Office*